UNITED STATES PATENT OFFICE.

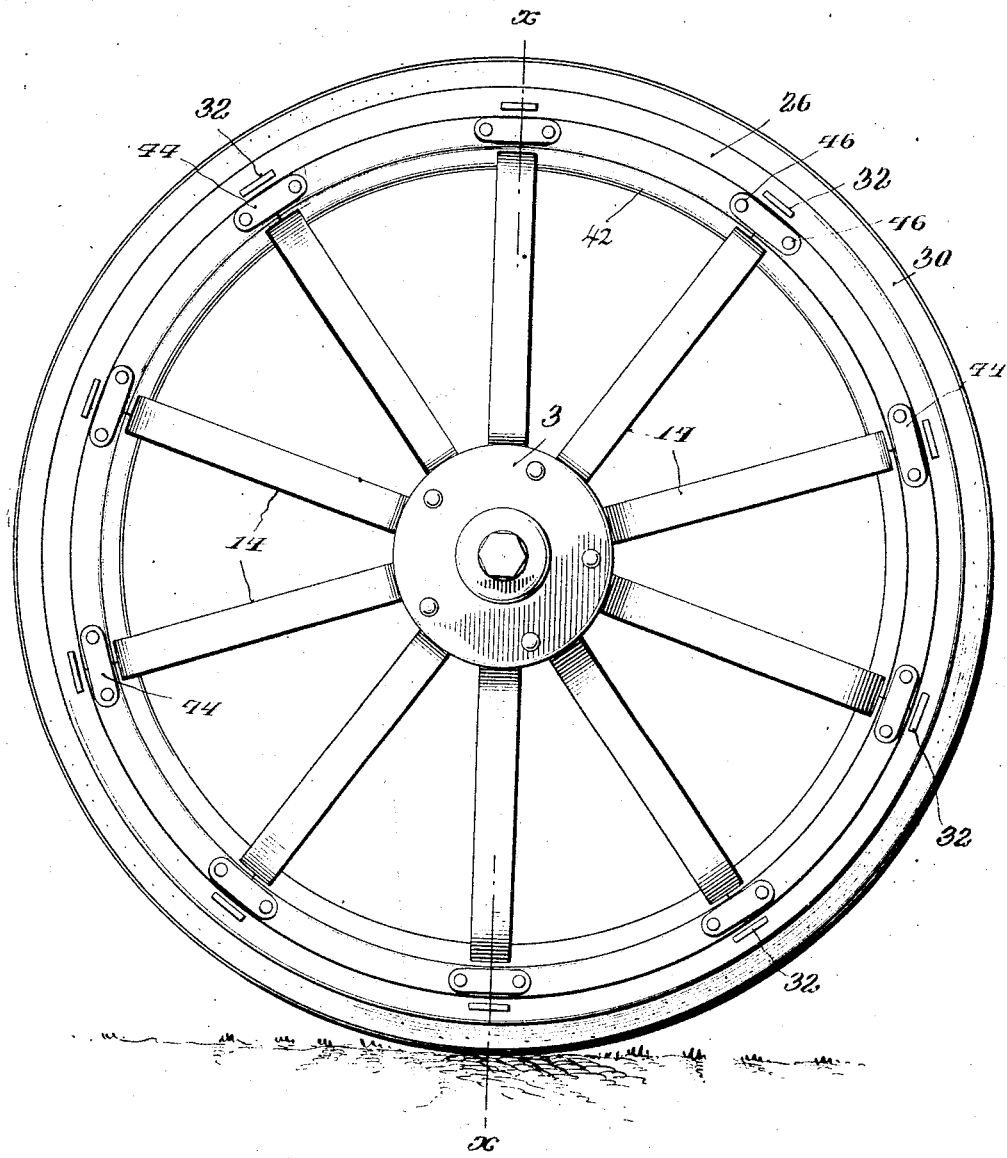

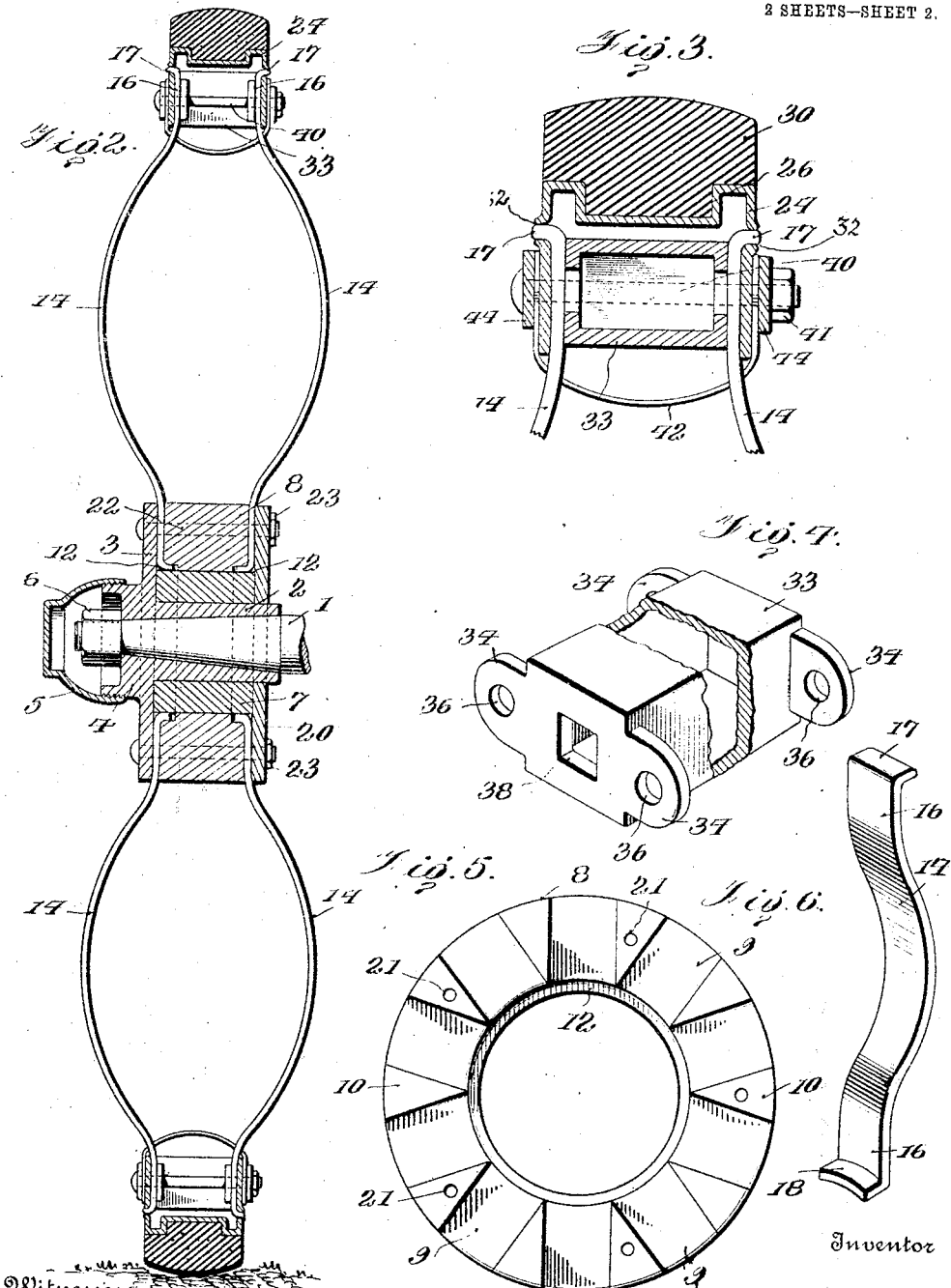

THOMAS J. HOLLAND, OF ANTIGO, WISCONSIN.

VEHICLE-WHEEL.

1,037,144.　　　　Specification of Letters Patent.　　Patented Aug. 27, 1912.

Application filed April 20, 1911. Serial No. 622,377.

*To all whom it may concern:*

Be it known that I, THOMAS J. HOLLAND, a citizen of the United States, residing at Antigo, in the county of Langlade and State of Wisconsin, have invented certain new and useful Improvements in Vehicle-Wheels, of which the following is a specification.

This invention relates to vehicle wheels, and more particularly to that class of wheels which are elastic or yieldable between the hub and tire.

An object of the invention is to provide in wheels of this class, an improved form of spoke which is so constructed and arranged as to provide a maximum amount of resiliency.

Another object of the invention is to provide simple, strong and efficient clamping means for fastening the spokes to the rim and hub of the wheel without perforating or otherwise removing the material of the spokes to weaken the same.

With these, and other objects in view, the invention consists in the construction and arrangement of parts which will hereinafter be more particularly described and claimed.

In the drawings: Figure 1 represents, in side elevation, a wheel embodying the present invention; Fig. 2 is a transverse section on the dotted line *x—x*, Fig. 1, the spokes being shown in elevation. Fig. 3 is an enlarged detail view, in transverse section, through the rim, tire and spoke-fastening devices; Fig. 4 is an enlarged perspective view, partly broken away, of the spoke clamping box, or spacer; Fig. 5 is a view in side elevation of the ring for receiving the inner ends of the spokes; and Fig. 6 is a perspective view of one of my improved spokes.

Referring to Fig. 2, the numeral 1 indicates the tapered end of an axle which has bearing in a tapered socket formed in a sleeve 2, which is shown as provided with a plate 3 and a projecting boss 4 which is threaded to receive the usual dust-excluding cap or cover 5. The end of the axle 1 may be provided with a thread to receive a nut 6, which bears against the boss 4 and holds the axle securely to the hub. The sleeve 2 is surrounded by a ring 7 which snugly fits the sleeve, said ring being in turn surrounded by an annulus 8 which is provided on each of its outer faces with a plurality of radial recesses 9 having their side walls formed by raised portions of the metal 10, of V-shape as best shown in Fig. 5 of the drawings. The depressions 9 are preferably of a depth which is substantially the same as the thickness of the ends of the spokes. The depressions 9 all terminate inwardly, on both sides of the annulus 8, in circular recesses 12, as indicated in Figs. 2 and 5 of the drawings.

The spoke 14 which I employ in the construction of this wheel is illustrated in Fig. 6 of the drawing, and is composed of steel, or other resilient metal, the spoke being elongated, as shown, and somewhat flattened in the direction of the plane of the wheel, and provided with a curved or bowed portion midway between its two ends. Near the ends of the spoke the metal is formed into flattened portions 16 to provide seats for the clamping means. The upper end of each spoke is bent as indicated at 17, at substantially right angles to the portion 16, and the opposite end of the spoke is bent transversely in similar manner, as indicated at 18, but said bent end portion or flange 18 is also slightly curved in a direction transverse of the spoke to snugly fit in the curved recess 12 which receives said flange.

Referring to Figs. 2 and 5, the spokes 14 have their lower ends as viewed in Fig. 6 snugly fitted within the depressed portions 9 of the annulus 8 and the flanges 18 of the spokes lie within the annular recesses 12 the corners of these recesses being rounded off, as shown in Fig. 2, in order to fit the slight curves formed when the metal of the spokes is bent at right angles to the spokes. Looking at Fig. 2, the plate 3 fits snugly upon the V-shaped partition walls 10 between the recesses 9 on the left hand side of the hub, and a circular plate 20 which is provided with an aperture to slip over the hub 2, fits tightly upon the partitions 10 of the annulus 8 upon the right hand side of the hub, said plates 3 and 20 closely overlying the subjacent flat portions 16 of the spokes. Perforations 21 are formed through a suitable number, or if desired all of the V-shaped partitions 10, and similar perforations are formed in the plates 3 and 20 to register therewith. Clamping bolts 22 pass through the perforations in the plates 3 and 20, and the perforations 21 in the partitions 10, and nuts 28 are threaded to the ends of these bolts, said bolts and nuts serving to firmly clamp the several described parts together, in order to hold the inner ends of the spokes tightly to the hub of the wheel.

The rim or felly 24 is herein shown formed as an open, channel-bar shaped member, which may be provided with an annular depression or seat 26 in its perimeter to receive any suitable form of tire 30. The outer side walls of the rim 24 are provided with slots 32, which are of a size and shape to snugly receive the flanges 17 at the outer ends of the spokes, as will appear from Figs. 2 and 3. In the formation of the slots 32 the metal is preferably forced outwardly by a punch, or other suitable tool, so that interiorly the walls forming these slots are slightly curved or beveled, as shown in Fig. 3. The flanges 17 may be slightly rounded at their inner corners so as to fit these curved walls, in the manner shown in Fig. 3. The outer ends of the spokes are restrained against inward movement by a rectangular box or spacer 33, which is provided at each end with two oppositely extending ears 34 each of which has a perforation 36 (see Fig. 4). Interiorly the box 33 may be hollow, and in order to conveniently remove the sand core used in molding the same the box may have at opposite ends suitable openings 38. The box 33 fits snugly between and abuts the flattened portions 16 of the outer ends of the spokes, the ears 34 extending upon opposite sides of each spoke, and the perforations 36 in said ears register with suitable perforations in the rim 24. Clamping bolts 40 pass through the perforations 36, and the perforations in the rim which register therewith, said clamping bolts being threaded to receive suitable nuts 41. An inner sheet metal, or other suitable form of casing 42, is provided to close the inner open portion of the channel shaped rim 24, the ends of the casing 42 extending upwardly to embrace the lower side walls of the rim, and having perforations alining with the perforations 36, and plates 44, also having perforations 46 in alinement with the perforations 36, overlie the upturned ends of the casing 42, and are located between them and the heads and nuts on the clamping bolts 40. It will be understood, that the bolts 40 pass through perforations in the plates 44, the upper side walls of the casing 42, the ears 34, and the rim 24, and when the nuts 41 are tightened, the outer ends of the spokes are firmly clamped against the ends of the boxes 33. This provides a very firm and efficient, as well as a simple clamping means for securing the outer ends of the spokes to the rim of the wheel. By removal of the nuts 41 and the bolt 40, the several parts are loosened, so that the boxes 33 may be taken out, and the ends of the spokes quickly disengaged from the slots 32.

A very important feature of my invention, consists in providing an arrangement of parts, which includes the spokes, for firmly clamping the spokes to the wheel without necessitating the formation of holes in the spokes, to receive bolts or the like. Holes when formed for this purpose have been found in practice to materially weaken the spokes of a spring wheel of this type, so that in the excessive and varying strain to which these spokes are subjected when in use, they are frequently broken. By my invention, I entirely obviate perforating the spokes, and hence am enabled to hold them firmly to the wheel without impairing their strength to resist the strains to which they are subjected.

As will be seen from Fig. 2 of the drawings, the spokes 14 may be bowed oppositely from the longitudinal median plane of the wheel, but I do not desire to be limited to bowing all of the spokes outwardly from such plane.

It is to be understood that changes in size, form, proportions, or details of construction, may be made without departing from the spirit of my invention, provided such changes fall within the scope of the following claims.

Having thus described my invention, what I claim as new and desire to secure by Letters Patent of the United States is:—

1. In a vehicle wheel, the combination comprising a hub having annular recesses, a rim provided in its sides with slots, spokes of resilient metal each composed of a flat strip having an intermediate portion which is regularly curved throughout and at opposite ends has portions which lie in the same plane and extend beyond the curved portions, and oppositely turned flanges at the ends of said spokes to, respectively, occupy said recesses and slots, combined with clamping means for securing the spokes to the hub and rim.

2. A vehicle wheel having, in combination, an annulus provided with radial depressions, an annular recess at the inner ends of said depressions, resilient spokes having flattened portions to fit said depressions and inturned angular flanges to fit said recesses, and clamping means for securing said spokes to said annulus.

3. A vehicle wheel having, in combination, an annulus provided with radial depressions and an annular recess at the inner ends of said depressions, resilient spokes having flattened portions to fit said depressions, and inturned angular transversely curved flanges to fit said recess, a clamping plate covering the ends of said spokes which are seated in the depressions, and bolts for fastening the plate to the annulus.

4. A vehicle wheel having, in combination, a hub, a rim provided in its sides with slots, resilient spokes having their inner ends secured to the hub and provided at their outer ends with bent flanges to enter said slots, an internal spacer between the outer ends of the spokes, and external clamping means to act on the rim and clamp the rim and spokes against said spacer.

5. A vehicle wheel having, in combination, a channeled rim provided in its sides with slots, resilient spokes having their outer ends flanged to enter said slots, spacer blocks arranged between said ends of the spokes and having laterally extending perforated ears located upon opposite sides of the spokes, and clamping bolts passing through the said ears and the rim to securely clamp the ends of the spokes between the spacer blocks and the walls of the rim.

6. A vehicle wheel having, in combination, a channeled rim provided in its sides with slots, resilient spokes having flanged ends to enter said slots, spacer blocks provided with laterally extending perforated ears located upon opposite sides of the spokes, a casing covering the inner open side of the rim and having its ends overlapping the side walls of said rim, and clamping bolts passing through said casing, rim and perforated ears for clamping the several parts against the spacer blocks.

7. A vehicle wheel having, in combination, a channeled rim provided in its sides with slots, resilient spokes having flanged ends to enter said slots, spacer blocks provided with laterally extending perforated ears located upon opposite sides of the spokes, a casing covering the inner open side of the rim and having its ends overlapping the side walls of said rim, perforated plates located outside the walls of said casing, and clamping bolts passing through the ears of the spacer blocks, the rim, the sides of said casing and the perforated plates to clamp said parts and the ends of the spokes to the spacer blocks.

In testimony whereof I affix my signature in presence of two witnesses.

THOMAS J. HOLLAND.

Witnesses:
STEPHEN J. MCMAHON,
C. A. MASON.

Copies of this patent may be obtained for five cents each, by addressing the "Commissioner of Patents, Washington, D. C."